United States Patent [19]

Miyahara

[11] 4,089,982
[45] May 16, 1978

[54] METHOD AND APPARATUS FOR THE PRODUCTION OF WRAPPED FOODS

[75] Inventor: Kingo Miyahara, Tokyo, Japan

[73] Assignee: Dowa Co., Ltd., Tokyo, Japan

[21] Appl. No.: 694,680

[22] Filed: Jun. 10, 1976

[30] Foreign Application Priority Data

Jun. 12, 1975 Japan .................................. 50-71233
Jun. 12, 1975 Japan .................................. 50-71234
Mar. 24, 1976 Japan .................................. 51-31454
Mar. 24, 1976 Japan .................................. 51-31455

[51] Int. Cl.² .................................................. A23L 3/32
[52] U.S. Cl. .................................. 426/107; 99/358; 426/234; 426/244; 426/394
[58] Field of Search .............. 426/107, 234, 113, 114, 426/244–247, 394; 206/.5, 204, 205; 220/13, 68, 23; 219/385–387, 214; 99/358

[56] References Cited

U.S. PATENT DOCUMENTS

| | | | |
|---|---|---|---|
| 1,481,971 | 1/1924 | Whiting | 206/205 X |
| 1,657,272 | 1/1928 | Neusbaum | 206/205 X |
| 1,930,169 | 10/1933 | Halvorson et al. | 99/358 |
| 2,306,573 | 12/1942 | Stern | 99/358 |
| 2,317,882 | 4/1943 | Boesel | 220/23 X |
| 3,053,667 | 9/1962 | Luijerink | 426/246 |
| 3,062,663 | 11/1962 | Furgal et al. | 426/107 X |
| 3,650,774 | 3/1972 | Beth et al. | 53/37 X |
| 3,873,742 | 3/1975 | Miyahara | 426/234 |
| 3,877,360 | 4/1975 | Vigerstrom | 99/358 |
| 3,966,972 | 6/1976 | Theimer et al. | 426/234 X |

FOREIGN PATENT DOCUMENTS

4,517,131 6/1970 Japan .................................. 426/244

*Primary Examiner*—Steven L. Weinstein
*Attorney, Agent, or Firm*—Jay L. Chaskin

[57] ABSTRACT

A salt-containing unprocessed foodstuff is charged in a wrapping tube unit comprising a cylindrical body, end plate means comprising members bonded to open opposite ends of the cylindrical body, and a pair of electrical contact members previously impregnated with a salt solution and fitted in the end plate means to provide a wrapped material foodstuff. The end plate means may be of any shape and is formed with a multitude of apertures, at least one of the members having cuts made therein to permit charging of the unprocessed foodstuff in the cylindrical body which may be deformed to conform to the shape of the end plate means. The apparatus for producing a wrapped food comprises a container in which the wrapped material foodstuff is placed and which is mounted on a carriage adapted to move in a reciprocating motion longitudinally of the apparatus, and a pair of electrode plates supported by guide rods disposed adjacent open opposite ends of the container and adapted to move in such a manner that, when the carriage moves in a reciprocating motion, the electrode plates also move in the same direction in a manner to be brought into and out of pressure engagement with recessed ends of the wrapped material foodstuff in the container to enable a current to be conducted through the unprocessed foodstuff to ripen it by the effect of Joule heat generated therein to produce a processed wrapped food. A sealing member may be applied to each end of the wrapped material foodstuff, before or after the conduction of the current, to enable the food to be preserved in cold storage.

4 Claims, 21 Drawing Figures

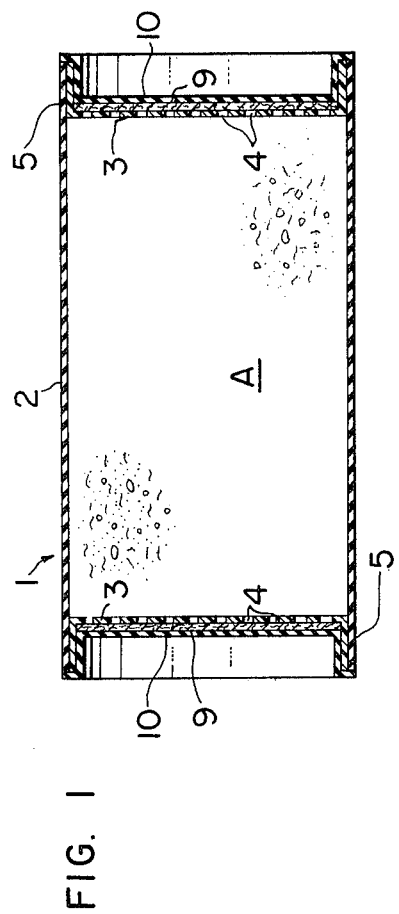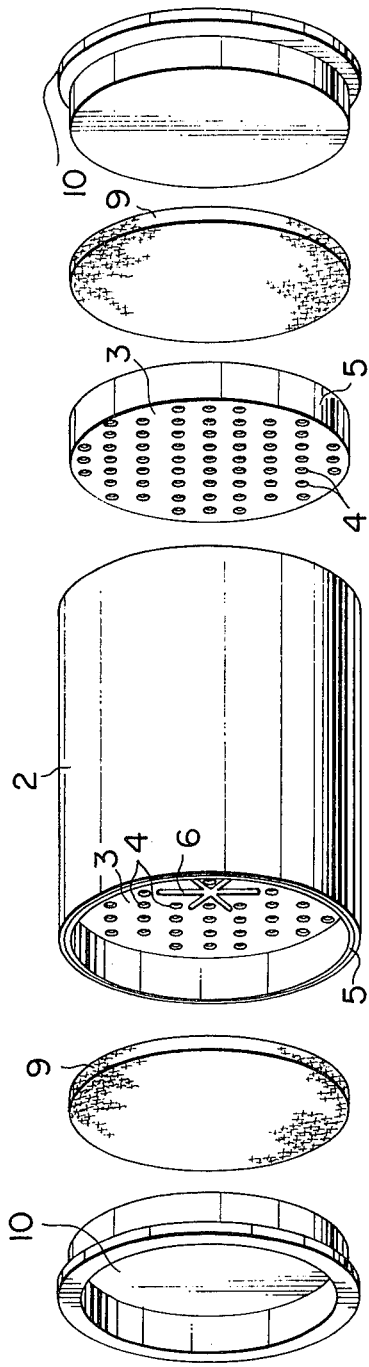
FIG. 1
FIG. 2

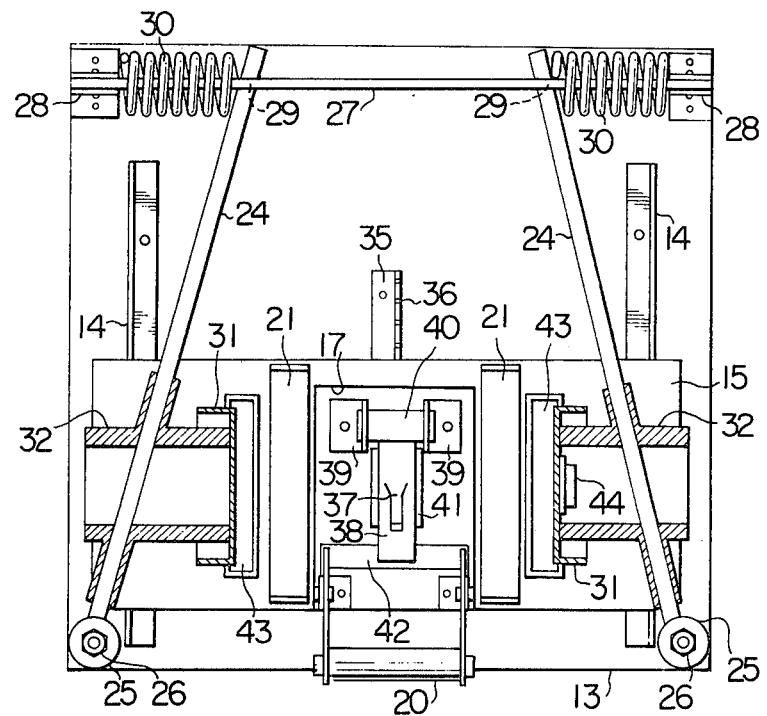
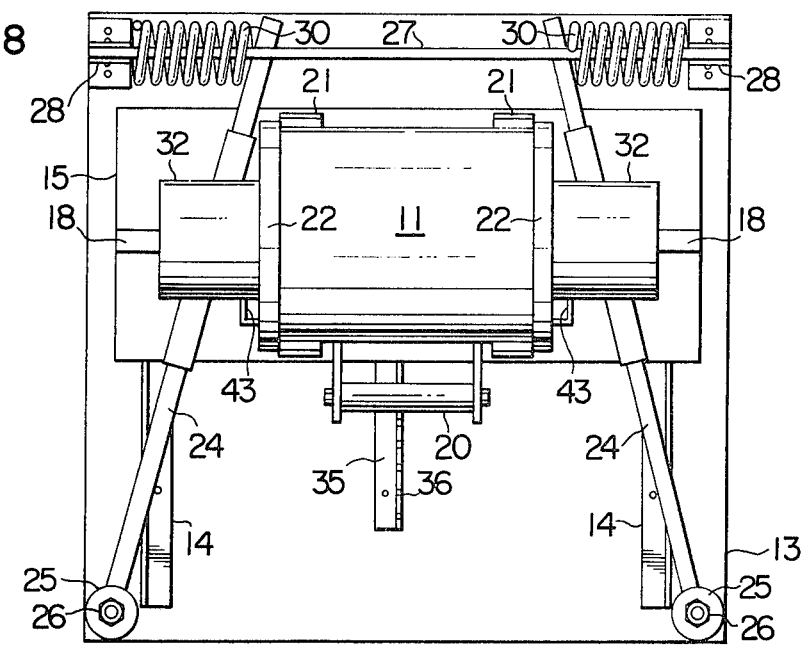

METHOD AND APPARATUS FOR THE PRODUCTION OF WRAPPED FOODS

This invention relates to a method and apparatus for the production of novel and improved wrapped foods. More particularly, the invention is concerned with a method and apparatus for the production of wrapped foods, such as meat, pork, cereals, vegetables or a mixture thereof, by processing the material foodstuffs, which are impregnated with a solution of salt and dampened beforehand, positively in a short period of time, simply by conducting a current through the foodstuffs as they are wrapped.

The present inventor has previously developed a process for producing a wrapped food, wherein a hard paste-like unprocessed foodstuff is charged into a wrapping tube made of an electrically insulating material, a pair of electrode plates are arranged in pressure engagement with opposite ends of the material foodstuff charged in the wrapping tube, and an electric current is conducted across the electrode plates, so that the unprocessed foodstuff can be ripened and sterilized in a short period of time as it is wrapped, so as to thereby produce a predetermined wrapped food. This process is described in detail in U.S. Pat. No. 3,873,742 which patent has been granted to the present inventor.

In the aforesaid process, an electrically conductive fiber body impregnated with a salt solution is either formed integrally with each end portion of the soft electrically insulating wrapping tube and disposed on the inner surface thereof or provided independently in each end portion of the wrapping tube so that it may be disposed at each end of the material foodstuff charged therein, in such a manner that the material foodstuff charged in the electrically insulating wrapping tube may be rendered conductive at opposite ends thereof to permit a current to be conducted therethrough. The wrapping tube is closed at opposite end portions by a suitable binding means such that a portion of the electrically conductive fiber body may be exposed to the outside at each end of the wrapping tube containing the material foodstuff sealed therein and an electrode plate may be brought into pressure engagement with the projecting portion of the electrically conductive fiber body at each end of the sealed wrapping tube, whereby a current can be conducted across the electrode plates to ripen and sterilize the material foodstuff sealed in the wrapping tube.

The process described above, however, has a disadvantage in that difficulty is encountered in charging the material foodstuff in the wrapping tube and closing each end portion of the wrapping tube by binding it in such a manner that a portion of the electrically conductive fiber body arranged in each end portion of the electrically insulating wrapping tube and disposed adjacent the foodstuff is exposed to the outside, since the electrically insulating wrapping tube and the electrically conductive fiber body are both made of a soft material. Thus, the operation of charging the unprocessed foodstuff in the wrapping tube and the operation of binding each end portion of the wrapping tube are time consuming, thereby making it impossible to increase overall operation efficiency.

Accordingly, it is an object of this invention to provide a method and apparatus for the production of a wrapped food which comprises a wrapping tube having different patterns at opposite ends thereof to thereby make it possible to charge a material foodstuff in the wrapping tube with greater ease and to eliminate the need to close the opposite end portions of the wrapping tube by binding them with a string or otherwise, said wrapping tube receiving at each end portion thereof an electrically conductive fiber body which has a flat surface adapted to be brought into pressure engagement with the flat surface of the associated electrode plate, whereby a current can be conducted uniformly through the entire body of the material foodstuff sealed in the wrapping tube.

Another object of the invention is to provide a method of production of a wrapped food which has no electrically conductive fiber body provided either integrally with the electrically insulating wrapping tube to be disposed on the inner surface of each end portion thereof or independently of the wrapping tube to be arranged in each end portion thereof so that a portion of the electrically conductive fiber body is exposed to the outside when the electrically insulating wrapping tube is closed at each end portion as has been the case with the prior art, said wrapped food comprising end plate means inserted in and bonded to opposite end portions of the electrically insulating wrapping tube, said end plate means comprising members each having a flat face formed therein with a multitude of apertures, and a plurality of electrical contact members impregnated with a solution of salt of a suitable percentage and detachably inserted in said end plate means to be disposed outwardly thereof in a manner to keep the outside end portions of the soft wrapping tube in a predetermined shape, said electrical contact members being flat in shape and having a large area so that each of them is in contact at one surface thereof, through the apertures formed in the end plate means, with a material foodstuff charged in the wrapping tube and at the other surface thereof in intimate contact with an electrode plate which is brought into contact therewith, in such a manner that the electrode plates, the electrical contact members and the material foodstuff can be brought into contact with one another uniformly irrespective of the degree of pressure applied by the electrode plates, whereby the material foodstuff can be uniformly ripened and sterilized.

Still another object of the invention is to provide a method for the production of a wrapped food of the type described, wherein one member of said end plate means is formed therein with cuts made in a radial pattern or in the form of a letter H, said cuts being pushed open by a material foodstuff supply hopper to permit the hopper to be inserted in the wrapping tube to positively charge a predetermined volume of material foodstuff when the material foodstuff is to be charged in the electrically insulating wrapping tube having the end plate means bonded to opposite end portions thereof, by fusion adhesion for example.

Still another object of the invention is to provide a method of production of a wrapped food of the type described, wherein a wrapped material foodstuff comprising an electrically insulating wrapping tube containing a material foodstuff charged therein, end plate means formed therein with a multitude of apertures and bonded to opposite end portions of said wrapping tube to provide a unitary structure, and a plurality of electrical contact members impregnated with a solution of salt and each inserted in one member of said end plate means further comprises a pair of sealing members each of which can be applied to one of opposite ends of the wrapped material foodstuff, so that the material foodstuff can be preserved for a long period of time and the drying of the electrical contact members impregnated with a solution of salt can be prevented, whereby a wrapped food can be produced in a normal and wholesome condition at all times.

A further object of the invention is to provide an apparatus for the production of a wrapped food, the apparatus comprising a base plate, a carriage movable in a reciprocating motion relative to the base plate, an electrically insulating container containing a wrapped material foodstuff and removably mounted on the carriage, and a pair of electrode plates each disposed adjacent one of open opposite ends of the electrically insulating container and supported by one of a plurality of movement guide members arranged above said base plate in a manner to converge in going from the front to the rear of the base plate, said pair of electrode plates being movable in a reciprocating motion as said carriage moves in a reciprocating motion, as that when the carriage moves from the front portion to the rear portion of the base plate the electrode plates move into the electrically insulating container in a manner to be brought into pressure engagement with opposite ends of the wrapped material foodstuff, the distance covered by the electrode plates in moving into the electrically insulating container from opposite directions being in direct proportion to the distance covered by the carriage moving in a reciprocating motion from the front portion to the rear portion and from the rear portion to the front portion of the base plate so that the electrode plates may be brought into pressure engagement with the opposite ends of the wrapped material foodstuff regardless of the length of the latter, and when the carriage moves from the rear portion to the front portion of the base plate the pair of electrode plates moves out of the open ends of the container, whereby a current can be conducted through the wrapped material foodstuff positively and a wrapped food with a good taste can be produced efficiently in a short period of time simply by conducting a current across the electrode plates.

A still further object of the invention is to provide an apparatus for the production of a wrapped food of the type described, wherein said plurality of movement guide members arranged above the base plate in a manner to converge in going from the front to the rear of the base plate each have one end portion received in a slot formed in a support bar in such a manner that the end portions of the plurality of movement guide members are urged to move toward each other by the biasing forces of resilient members, to thereby bring the pair of electrode plates into pressure engagement with the opposite ends of the wrapped material foodstuff through the pair of movement guide members by the biasing forces of the resilient members when the conduction of a current through the wrapped material foodstuff is initiated, whereby the electrode plates can be maintained in pressure engagement with the opposite ends of the wrapped material foodstuff even when the material foodstuff expands as it is ripened to thereby enable the current to be conducted through the wrapped foodstuff in a stable manner, and at the same time to thereby prevent inordinate expansion of the wrapped material foodstuff so that the foodstuff is sufficiently ripened to provide uniformly finished wrapped foods.

Additional and other objects and features of the invention will become apparent from the description set forth hereinafter when considered in conjunction with the accompanying drawings, in which:

FIG. 1 is a vertical sectional view of a wrapped material foodstuff obtained by charging a material foodstuff in an electrically insulating wrapping tube;

FIG. 2 is a developed perspective view of the wrapped material foodstuff shown in FIG. 1;

FIG. 17 is a plan view, with the essential portions being cut away, of the apparatus shown in FIG. 16, with the apparatus being shown at the time of initiation of its operation;

FIG. 18 is a plan view of the apparatus shown in FIG. 16, with the apparatus being shown at the time when a current is conducted through a wrapped material foodstuff placed in the container;

Figure 3:
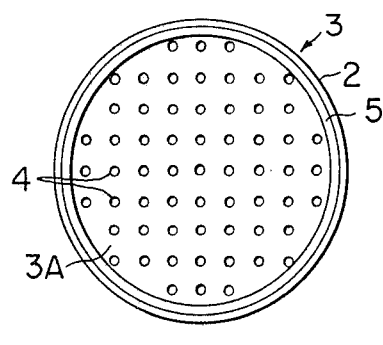
FIG. 3 is a side view as seen from the right of the wrapped material foodstuff shown in FIG. 1, with the sealing member and the salt-solution impregnated electrical contact member being removed therefrom.

The invention will now be described with reference to the drawings in which like reference characters and numerals designate similar parts in all the drawings. The numeral 1 designates a wrapped material food stuff obtained by charging unprocessed foodstuff A in an electrically insulating wrapping tube 2. The unprocessed foodstuff A is obtained by immersing unprocessed meat, pork, fish, cereals, vegetables or a mixture thereof in a solution of salt of a suitable percentage and then adding or without adding suitable condiments. The electrically insulating wrapping tube 2 is made of a heat-resistant soft and thin material and open at both ends.

End plate means 3 comprises a member made of a resilient material, each of said members being inserted in and bonded by melt adhesion, for example, to one of the two opposite end portions of the wrapping tube 2. Each member of the end plate means 3 comprises a flat surface portion 3A formed therein with a multitude of apertures 4, and a protruding edge portion 5 formed integrally with and extending from the flat surface portion 3A. The end plate means 3 is made of a synthetic resinous material of a slightly greater thickness than the wrapping tube 2 and may be of any shape as desired, such as circular, triangular, rectangular, polygonal or elliptic as shown in FIGS. 6 to 10. The provision of the protruding edge portion 5 of a suitable length enables each member of the end plate means 3 to be readily inserted in and bonded to one of the opposite end portions of the wrapping tube 2.

Figure 4:
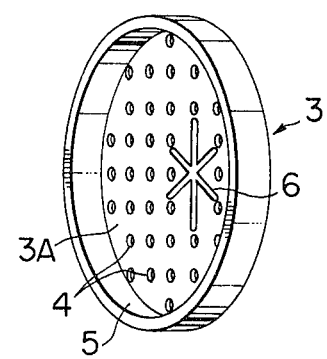
FIG. 4 is a perspective view, with certain parts being cut out, of one member of the end plate means in which cuts are made.
Figure 5:
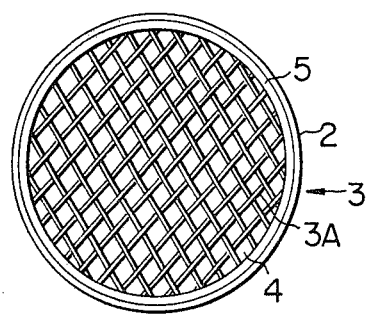
FIG. 5 is a side view of one member of the end plate means of another form in which the flat surface portion thereof is in the form of a net.
Figure 6:
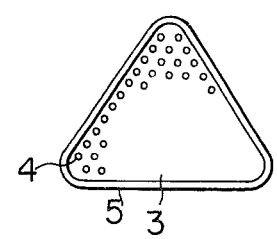
FIG. 6 is a side view of the end plate means of a triangular shape.
Figure 7:
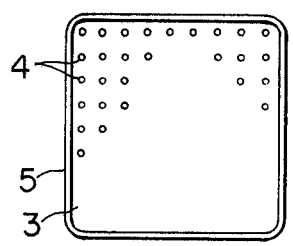
FIG. 7 is a side view of the end plate means of a square shape.
Figure 8:
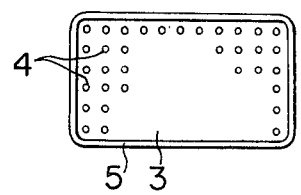
FIG. 8 is a side view of the end plate means of a rectangular shape.
Figure 9:
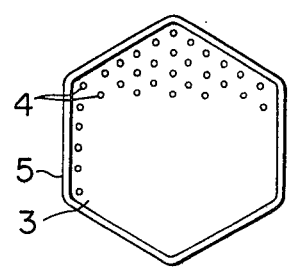
FIG. 9 is a side view of the end plate means of a polygonal shape.
Figure 10:
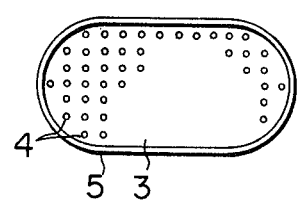
FIG. 10 is a side view of the end plate means of an elliptic form.
Figure 13:
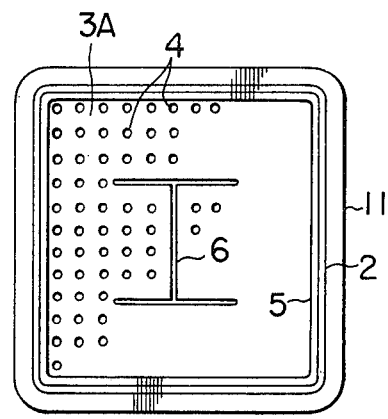
FIG. 13 is a side view of one member of the end plate means in which cuts are made in the form of a letter H.
Figure 14:
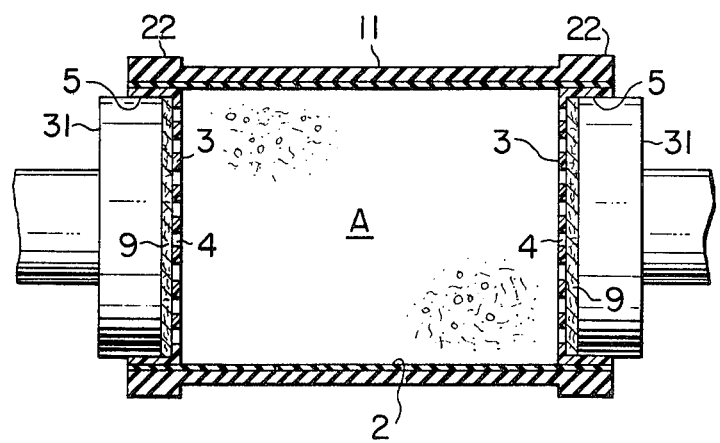
FIG. 14 is a vertical sectional front view, with certain parts being cut out; showing the manner in which the wrapped food according to the invention is produced.

The flat surface portion 3A of the end plate means 3 may be in the form of a net as shown in FIG. 5. In this case, the meshes serve as the current conducting apertures 4. Thus, by inserting the end plate means 3 of different shapes in opposite end portions of the soft wrapping tube 2, it is possible to deform the wrapping tube into any shape as desired. One member of the end plate means 3 has cuts 6 made therein to facilitate the operation of charging the unprocessed foodstuff A in the wrapping tube 2. In case the end plate means 3 is circular in shape, the cuts 6 are made in a radial pattern as shown in FIG. 4. However, when the end plate means 3 is either square or polygonal in shape as shown in FIG. 7 or 9, the cuts 6 are conveniently made in the form of a letter H as shown in FIG. 13 to facilitate the operation of charging the unprocessed foodstuff A.

In charging the unprocessed foodstuff A in the wrapping tube 2 comprising the end plate means 3 bonded by melt adhesion, for example, to opposite end portions of the wrapping tube 2, the wrapping tube 2 is brought to an upright position in which its longitudinal axis is oriented vertically and the member of the end plate means 3 having the cuts 6 made therein faces upwardly. Then, a foodstuff supply hopper 7 is brought into pressure engagement with the cuts 6 in the end plate means 3. The result of this is that partly loose pieces 8 formed by the cuts 6 move to the position shown in FIG. 12 to thereby permit the unprocessed foodstuff A to be readily charged in the wrapping tube 2. Upon completion of charging, the foodstuff supply hopper 7 is withdrawn from the wrapping tube 2. This permits the partly loose pieces 8 to be restored to their original positions shown in FIG. 11 by virtue of the resilience of the material of the end plate means 3.

After the unprocessed foodstuff A is charged in the wrapping tube 2, a salt-containing electrical contact member 9 such as a fiber pad impregnated with a solution of salt and dried is fitted in each member of the end plate means 3 to provide a wrapped material foodstuff 1. In conducting a current through the unprocessed foodstuff A in the wrapping tube 2, water or a solution of salt is supplied from outside to the electrical contact members 9. Alternatively, the electrical contact members 9 in the form of fiber pads may be fitted in the end plate means 3 without being previously impregnanted with a solution of salt, and may be caused to absorb a salt solution immediately before a current is conducted through the unprocessed foodstuff. A sealing member 10 may be detachably applied to each end of the wrapped material foodstuff 1, so that the wrapped material foodstuff 1 can be sealed in a manner to permit the unprocessed foodstuff A to be preserved in cold storage. Moreover, the sealing members 10 may be applied to the wrapped material foodstuff 1 after the foodstuff is ripened by conducting a current therethrough so as to preserve the processed wrapped food without spoiling the taste. The reference numeral 11 designates a container made of a heat resisting and electrically insulating material for receiving therein the wrapped material foodstuff 1 prepared as aforementioned. The container 11 is open at both ends and has a cross-sectional shape which is identical to the cross-sectional shape of the end plate means 3.

Figure 15:
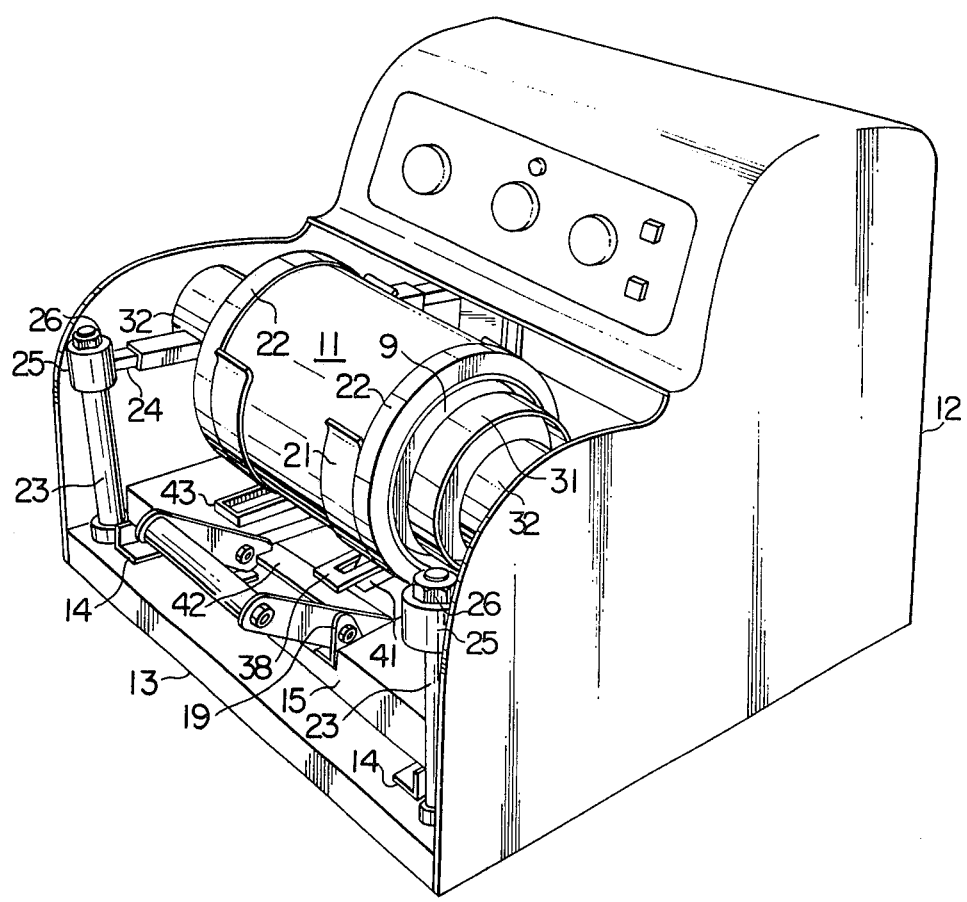
FIG. 15 is a perspective view of one form of the apparatus adapted to carry into practice the method of production of a wrapped food by following the basic processing steps in accordance with the invention.

FIG. 15 to FIG. 21 show an apparatus adpated to practice the method of the invention in a manner to conduct a current through the wrapped material foodstuff 1 prepared as aforementioned so as to positively ripen and sterilize in a short period of time the unprocessed foodstuff A by the effect of Joule heat generated therein. The construction of the apparatus will now be described in detail with reference to the embodiment shown in the drawings. Referring to FIG. 15, the numeral 12 designates a casing of the box shape open at its front portion and including an instrument board arranged at the front of its upper portion. The casing 12 includes a base plate 13 disposed at its bottom, and a pair of parallel guide rails 14, 14 are disposed longitudinally of the casing 12 such that each rail 14 is arranged in one lateral marginal portion of the base plate 13. A carriage 15 made of an electrically insulating material is adapted to move along the rails 14, 14.

Figure 19:
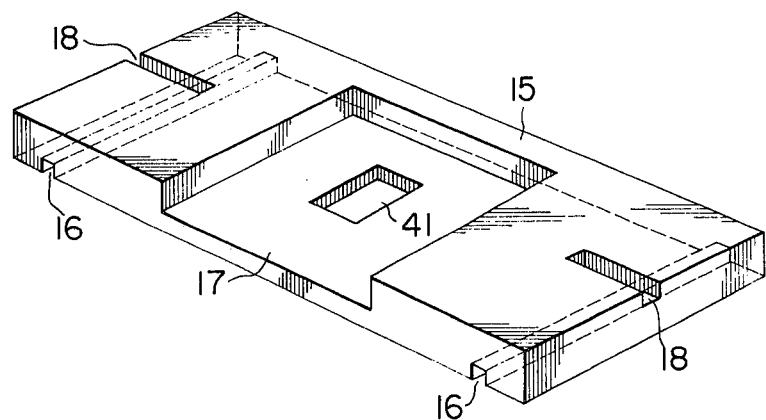
FIG. 19 is a perspective view of the carriage in its entirety.

As shown in detail in FIG. 19, the carriage 15 is substantially rectangular in shape and formed, on its underside, with parallel grooves 16, 16 for receiving the rails 14, 14 therein. The carriage 15 is formed, in its upper surface, with a recess 17 of a suitable size which is disposed substantially in the central portion of the carriage 15. Transverse grooves 18, 18 for receiving therein electrode guide members 33, 33 subsequently to be described are formed at opposite lateral marginal portions of the carriage 15 substantially at the central portion and disposed at right angles to the grooves 16, 16.

Arranged in the front of the recess 17 are mounting members 19, 19 which support a handle 20 for causing the carriage 15 to stop or release the same from its stationary position. Support members 21, 21 of the semicircular band shape made of a resilient material and having upper ends slightly bent outwardly are arranged on the carriage 15 in positions on opposite sides of the recess 17 and disposed parallel to the rails 14, 14 so as to removably support the cylindrical insulating container 11 is made in cylindrical form from an electrically insulating material and open at opposite ends. The container 11 is formed at opposite ends of its outer periphery with flanges 22, 22 which are adapted to be brought into contact with the support members 21, 21 so as to accurately position the container 11 on the support member 21, 21. The wrapped material foodstuff 1 prepared as aforementioned is placed in the electrically insulating container 11.

Adjusting rods 23, 23 are disposed in upright positions at opposite corners in the front portion of the base plate 13. Each adjusting rod 23 has fitted thereon a boss 25 connected to one end of a movement guide rod 24 of square cross-sectional shape. The boss 25 is held in position by means of a nut 26. By loosening and fastening the nut 26, the boss 25 can be moved up and down along the associated adjusting rod 23.

The numeral 27 designates a support bar held horizontally along the rear end of the base plate 13 by two mounting posts 28, 28 disposed in upright positions at opposite corners in the rear portion of the base plate 13. The support bar 27 is formed therein with two slots 29, 29 which are disposed symmetrically at opposite end portions of the support bar 27. The movement guide rods 24, 24 each have their free end portion inserted in one of the slots 29, 29 and extending therethrough. The free end portions of the movement guide rods 24 received in the slots 29, 29 are urged to move inwardly or towrad each other by the biasing forces of resilient members 30, 30, respectively. The movement guide rods 24, 24 arranged as aforementioned are disposed adjacent opposite ends of the electrically insulating container 11 such that they converge or move toward each other in going from the front of the base plate 13 to the rear thereof.

The reference numeral 31 designates a pair of electrode plates across which a current is conducted to ripen the wrapped material foodstuff 1 contained in the container 11 to produce a predetermined wrapped food. Since the electrode plates 31, 31 are moved into and out of the container 11 in operation, each of them is shaped substantially like the inner portion of the container 11 and has a flat face, in order that the electrode plates 31, 31 may be brought into intimate contact with the electrical contact members 9, 9 uniformly over the entire surface. Each electrode plate 31 is formed integrally with an electrode plate supporter 32 disposed at one side of the electrode plate 31 and having one of the movement guide rods 24. 24 penetrating therethrough. The electrode plates 31, 31 constructed as aforementioned are disposed on opposite sides of the container 11 and spaced apart from the open ends thereof. The electrode plate supporters 32, 32 each have an electrode plate movement guide 33 extending downwardly therefrom and inserted at its lower end in one of the transverse grooves 18. By this arrangement, when a set of electrode plate 31 and electrode plate supporter 32 and another set of electrode plate 31 and electrode plate supporter 32 move back and forth along the movement guide rods 24, 24 respectively which converge or move toward each other in going from the front to the rear of base plate, the electrode plates 31, 31 move toward or away from each other on the carriage 15 as they are guided by the transverse grooves 18, 18.

Thus, the electrode plates 31, 31 are automatically moved into and out of the electrically insulating container 11 as they move from the front portion to the rear portion and from the rear portion to the front portion of the base plate 13.

Figure 20:
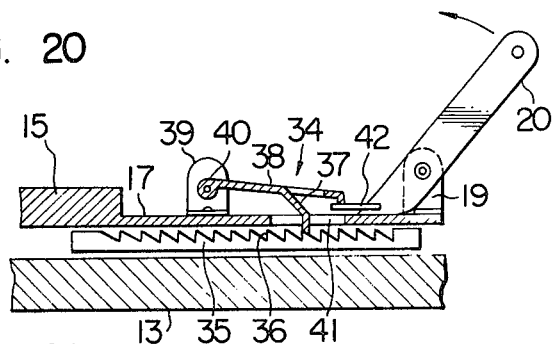
FIG. 20 is a vertical sectional side view, with certain parts being cut out, of the apparatus showing the operation of bringing the carriage to a position in which it stops.
Figure 21:
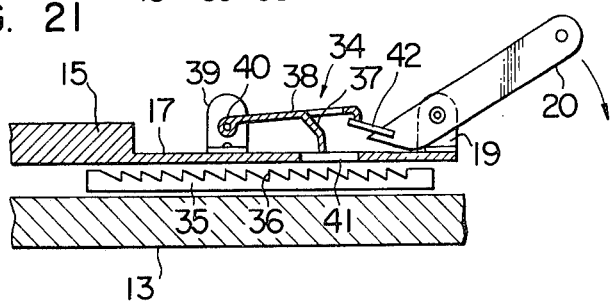
FIG. 21 is a vertical sectional side view, with certain parts being cut out, of the apparatus showing the operation for releasing the carriage from the position in which it remains stationary.

The numeral 34 designates means for stopping or starting the movement of the carriage 15 adapted to move in reciprocatory motion from the front portion to the rear portion and from the rear portion to the front portion of the base plate 13 (See FIGS. 20 and 21). The carriage starting and stopping means 34 comprises a locking bar 35 provided on its surface with teeth 36 sloping in one direction and secured substantially in the center of the base plate 13 in a manner to extend along the longitudinal axis thereof, a locking member 38 including a pawl 37 formed integrally with the member 38 and adapted to be brought into and out of locking engagement with the teeth 36 and a boss 40 provided at the base of the member 38 and pivotally supported by a pair of bearing metal members 39, 39 disposed in the recess 17 formed in the carriage 15, and an opening 41 formed in the recess 17 through which the pawl 37 extends slopingly downwardly toward the locking bar 35. The locking member 38 has a free end which rests at all times on a push-up bar 42 mounted at the lower end of the handle 20 supported by the mounting metal members 19, 19, in such a manner that the free end of the member 38 can be moved vertically as the handle 20 is operated.

Thus, when the handle 20 is moved counter clockwise as shown in FIG. 20, the free end of the locking bar resting on the push-up plate 42 moves downwardly in a manner to cause the pawl 37 to come into engagement with one of the teeth 36 to thereby cause the carriage 15 to stop in any position as desired. Conversely, when the handle 20 is moved clockwise as shown in FIG. 21, the free end of the locking bar 38 is pushed upwardly by the push-up bar 42 in a manner to cause the bar 38 to pivotally move counter clockwise and bring the pawl 37 out of engagement with one of the teeth 36 to thereby release the carriage 15 from its stationary condition. The numeral 43 designates a pair of boxes arranged on the carriage 15 and disposed below the opposite open ends of the container 15 supported by the support members 21, 21 for receiving therein a liquid oozing out of the wrapped material foodstuff 1. The numeral 44 is a heat-sensitive switch mounted in one of the electrode plates 31, 31 and adapted to cut off the supply of a current to the electrode plates 31, 31 when actuated.

In order to produce a wrapped food in accordance with the invention, it is first necessary to prepare the wrapped material foodstuff 1. In preparing the wrapped material foodstuff 1, the end plate means 3 of any shape as desired is inserted in open opposite end portions of the electrically insulating wrapping tube 2 of a small thickness. The end plate means 3 comprises two members, one of the two members having a flat surface portion 3A formed therein with a multitude of apertures 4 and the other member having a flat surface portion 3A formed therein with a multitude of apertures 4 and provided with cuts 6 of any pattern as desired made therein, both members each having the protruding edge portion 5 extending at right angles to the flat surface portion 3A. The members of the end plate means 3 are inserted in opposite end portions of the wrapping tube 2 in face-to-face relation and bonded by fusion adhesion, for example, at the protruding edge portions 5 to the wrapping tube 2 in a manner to form the wrapping tube 2 into the same shape as the end plate means 3.

Figure 11:
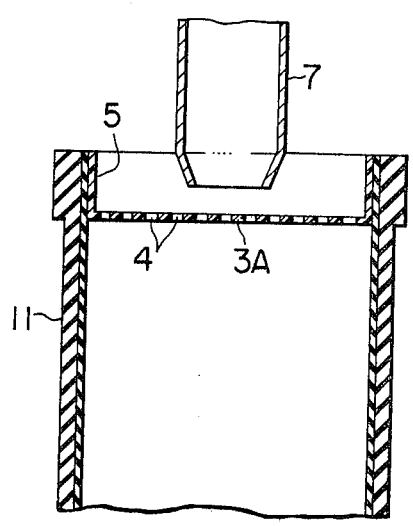
FIG. 11 is a vertical sectional front view, with certain parts being cut out, of the wrapping tube arranged in such a manner that the member of the end plate means having cuts made therein faces upwardly before charging of a material foodstuff is initiated.
Figure 12:
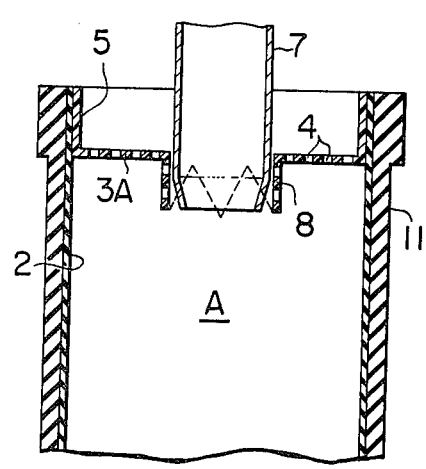
FIG. 12 is a vertical sectional front view, with certain parts being cut out, of the wrapping tube in which a material foodstuff is being charged.

Then, the wrapping tube 2 obtained in this way is brought to an upright position in which the member of the end plate means 3 having the cuts 6 made therein faces upwardly as shown in FIG. 11, and the material foodstuff supply hopper 7 is forced against the portion of the end plate means 3 which has the cuts 6 made therein. This causes the partly loose pieces 8 formed by the cuts 6 to move downwardly as shown in FIG. 12, thereby permitting the hopper 7 to find its way into the wrapping tube 2. Thus, by supplying a desired material foodstuff through the hopper 7, it is possible to quickly charge the desired foodstuff in the wrapping tube 2. The material foodstuff charging operation can be performed smoothly because, as the material foodstuff A is charged, the air contained in the wrapping tube 2 escapes to the outside through the apertures 4. Upon completion of the material foodstuff charging operation, the material foodstuff charging hopper 7 is withdrawn from the wrapping tube 2. This allows the partly loose pieces 8 to be restored to their original positions in such a manner that the flat surface portion 3A of end plate means 3 becomes flat again as shown in FIG. 11. Thereafter, each of the electrical contact members 9, 9 made of a fibrous material and previously impregnated with a salt solution is fitted in the recessed portion of one of the members of the end plate means 3 and brought into intimate contact with the flat surface portion 3A of the end plate means 3, and each of the sealing members 10, 10 is applied to the outside of one of the electrical contact members 9, 9. Thus, there is produced the wrapped material foodstuff 1 containing the unprocessed foodstuff A therein. Since the wrapped material foodstuff 1 produced in this way is impervious to air, it can be stored in cold storage for a long period of time. A large number of wrapped material foodstuffs A are prepared beforehand by the aforesaid process.

Figure 16:
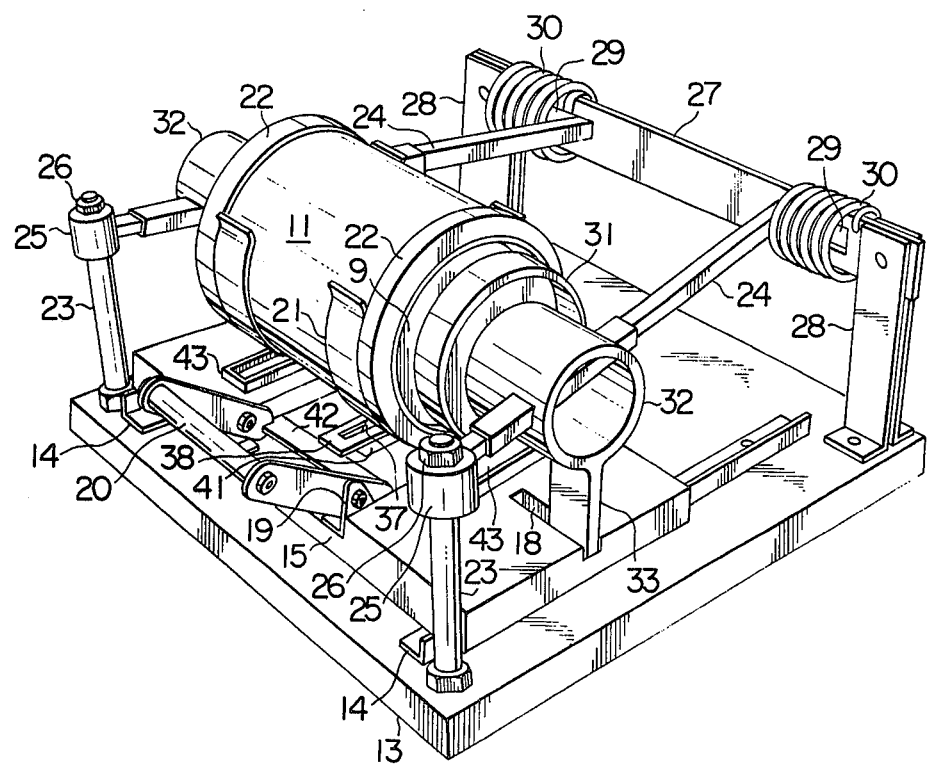
FIG. 16 is a perspective view of the apparatus shown in FIG. 15, showing its essential portions with the cover being removed.

The operation of continuously producing wrapped foods of good taste simply by conducting a current through the unprocessed foodstuff A in the wrapped material foodstuff 1 will now be described. The production of the wrapped foods can be accomplished in a short period of time by using the apparatus shown in FIG. 15 to FIG. 21. First of all, the sealing members 10, 10 are removed from the wrapped material foodstuff 1, and the electrical contact members 9, 9 previously impregnated with a salt solution are added with water. Then, the wrapped material foodstuff 1 is placed in the electrically insulating container 11, and the container 11 is mounted on the support members 21, 21 in a manner to be held in a predetermined position on the carriage 15. The container 11 is conveniently mounted on the support members 21, 21 when the carriage 15 is disposed in the front portion of the base plate 13 as shown in FIG. 16.

After the container 11 is placed on the support members 21, 21, the handle 20 is moved toward the rear of the base plate 13 while being pushed downwardly or pivotally moved clockwise as shown in FIG. 21. This releases the pawl 37 from engagement with one of the teeth 36 in a manner to unlock the carriage 15, so that the carriage 15 can be moved from the front portion to the rear portion of the base plate 13 along the guide rails 14, 14. As the carriage 15 moves in the indicated direction, the two sets of electrode plates 31, 31 and electrode plate supporters 32, 32, each of which is disposed at one end of the container 11, also move along the movement guide rods 24, 24 in the same direction and cover the same distance as the carriage 15. At this time, since the movement guide rods 24, 24 converge in going from the front to the rear of the base plate 13, the two sets of electrode plates 31, 31 and electrode plate supporters 32, 32 move toward each other as they are guided by the electrode plate movement guides 33, 33 received in the transverse grooves 18, 18 till the electrode plates 31, 31 move into recessed opposite ends of the container 11. Thus, the operation of moving the carriage 15 from the front portion to the rear portion of the base plate 13 is continued until the two electrode plates 31, 31 are positively brought into pressure engagement with the electrical contact members 9, 9 previously impregnated with a solution of salt and positioned on opposite ends of the wrapped material foodstuff 1 placed in the container. When the carriage 15 moves from the front portion to the rear portion of the base plate 13 along the rails 14, 14, the two electrode plates 31, 31 can move accurately into the recessed ends of the container 11 without wobbling to left and right by virtue of the fact that they guided by the electrode plate movement guides 33, 33 moving through the transverse grooves 18, 18 formed in the carriage 15 and also by the movement guide rods 24, 24 which are square in cross-sectional shape.

After it is ascertained that the two electrode plates 31, 31 are positively brought into pressure engagement with the salt-water containing electrical contact members 9, 9 respectively by the above-described operation, the handle 20 is pivotally moved counter clockwise as shown in FIG. 20. This moves the free end of the locking member 38 downwardly and permits the member 38 to pivotally move clockwise, in such a manner that the pawl 37 is brought into engagement with one of the teeth 36 to lock the carriage 15 in position. Then, a current is conducted across the two electrode plates 31, 31. The current flows smoothly and uniformly through the entire body of the unprocessed foodstuff A since the electrical contact members 9, 9 are impregnated with a solution of salt and the flat surface portions 3A of the end plate means 3 are formed with apertures 4, whereby the material foodstuff is sterilized and ripened by the effect of Joule heat generated therein in a short period of time. Thus, a product wrapped food can be produced.

In the process of ripening by the effect of Joule heat, the material foodstuff charged in the wrapping tube 2 expands gradually and tends to push the electrode plates 31, 31 out of the recessed ends of the container 11. However, since the free end portions of the movement guide rods 24, 24 supporting the electrode plates 31, 31 are inserted in the slots 29, 29 in the support bar 27 and urged to move inwardly or toward each other by the biasing forces of the resilient members 30, 30 respectively, the electrode plates 31, 31 move outwardly while being maintained in intimate contact with the wrapped material foodstuff 1, as the movement guide rods 24, 24 move outwardly, in such a manner that spontaneous rupture of the wrapped material foodstuff 1 due to the expansion of the unprocessed foodstuff A can be prevented and at the same time conduction of the current can be continued. Upon the temperature of the wrapped material foodstuff 1 reaching a predetermined level, the heat-sensitive switch 44 arranged in one of the electrode plates 31, 31 is actuated in a manner to cut off the supply of current, thereby producing a perfect wrapped food. Thus, the processed wrapped food has a good taste because the material foodstuff is suitably compacted and processed in a short period of time. Moreover, the processed wrapped food is free from electrolytic discoloration at opposite end portions thereof, and colored uniformly through the entire body thereof.

After a processed wrapped food is produced as described above, the handle 20 is pivotally moved clockwise as shown in FIG. 20 to unlock the carriage 15 and pulled toward the operator to move the carriage 15 from the position shown in FIG. 18 to the position shown in FIG. 17. As the carriage 15 moves from the rear portion to the front portion of the base plate 13, the two electrode plates 31, 31 move out of the recessed ends of the container 11, thereby permitting the container 11 to be removed from the support members 21, 21 and the next following container 11 to be mounted thereon. The process of the ripening unprocessed foodstuff A in the container 11 is repeated, so that processed wrapped foods can be continuously produced by repeating the same processing steps.

According to the invention, as described hereinabove, an unprocessed foodstuff A is immersed in a solution of salt for a certain period of time so that it may be previously impregnated with a solution of salt, and then charged in a wrapping tube 2 made of a soft and electrically insulating material comprising end plate means 3 of any shape as desired which is bonded to open opposite end portions of the wrapping tube 2 to close and maintain it in a predetermined shape, the end plate means 3 comprising two members each having a flat surface portion 3A formed therein with apertures 4 and a protruding edge portion 5 but one of the members having cuts 6 made in the flat surface portion 3A to permit charging of the unprocessed foodstuff therethrough. The contact members 9, 9 made of a fibrous material and previously impregnated with a solution of salt are fitted in the recessed ends of the end plate means 3 respectively to prepare a wrapped material foodstuff 1 which is placed in an electrically insulating container 11. The electrode plates 31, 31 are brought into pressure engagement with the electrical contact members 9,9 impregnated with a solution of salt and having a flat surface due to contact with the end plate means 3, and then a current is conducted across the two electrode plates 31, 31. Since the opposite end portions of the electrically insulating wrapping tube 2 of a soft material can be maintained in any shape as desired by the use of the end plate means 3, it is possible to maintain the electrical contact members 9, 9 in a flat state without being distorted and keep them in intimate pressure engagement with the electrode plates 31, 31 in a manner to enable a current to be conducted smoothly through the entire body of the unprocessed foodstuff A and to prevent the development of unripened portions therein.

In the process of ripening by the effect of Joule heat, the liquid oozing out of the unprocessed foodstuff A which is previously impregnated with a solution of salt passes through the multitude of apertures 4 formed in the flat surface portion 3A of each member of the end plate means 3, and is absorbed by the electrical contact members 9, 9 of the fibrous material previously impregnated with a solution of salt, in such a manner that the unprocessed foodstuff A, electrical contact members 9, 9 and the electrode plates 31, 31 can be positively brought into pressure engagement with one another so as to permit ripening and sterilization to take place uniformly in the entire body of the foodstuff.

According to the invention, as described above, one of the members of the end plate means 3 of the wrapping tube 2 has cuts 6 made in the flat surface portion 3A thereof to enable a material supply hopper 7 to be inserted into the wrapping tube 2 through an opening formed by moving partly loose pieces 18 of the flat surface portion 3A, thereby simplifying and facilitating charging of the unprocessed foodstuff in the wrapping tube 2 which is closed by the end plate means 3 fitted in open opposite ends of the tube 2.

According to the invention, sealing members 10 are removably applied to the opposite ends of the wrapped material foodstuff 1 prepared by charging an unprocessed foodstuff A in a wrapping tube 2. By providing the sealing members 10, it is possible to produce a large number of wrapped material foodstuff 1 at a time and preserve them in cold storage for a long period of time in producing processed wrapped foods, because invasion of the wrapped material foodstuffs 1 by air can be prevented in a manner to preclude decomposition and deterioration of the unprocessed foodstuff. The wrapped material foodstuffs 1 preserved in this way can be processed at any time as desired by removing the sealing members and simply by conducting a current therethrough, after which the processed wrapped foods can be preserved again in a wholesome condition without becoming unsavory by applying the sealing members again.

According to the invention, there is provided an apparatus adapted to produce a wrapped food by conducting a current through the wrapped material foodstuff 1 placed in an electrically insulating container 11, which apparatus is constructed in such a manner that, if the container 11 is placed on the support members 21, 21 disposed on the carriage 15 and the carriage 15 is moved from the front portion to the rear portion of the base plate 13, the two electrode plates 31, 31 can be automatically moved into open opposite ends of the container 11 and brought into pressure engagement with the wrapped material foodstuff 1 so that ripening and sterilization of the unprocessed foodstuff A can be effected in a short period of time simply by conducting a current across the two electrode plates 31, 31 to thereby produce a delicious processed wrapped food, since the electrode plates 31, 31 are supported by the movement guide rods 24, 24 each disposed at either end of the container 11 in spaced-apart relation and disposed above the base plate 13 in a manner to converge in going from the front to the rear of the base plate 13, and capable of moving in a reciprocating motion between the front and rear portions of the base plate 13 together with the carriage 15. If the carriage 15 is moved from the rear portion to the front portion of the base plate 13, it is possible to automatically move the electrode plates 31, 31 out of the container 11 because they move along the movement guide rods 24, 24, thereby facilitating the removal of the container 11 from the support members 21, 21. It will be appreciated that, if the apparatus according to the invention is used, processed wrapped foods can be readily produced simply by moving the carriage 15 in a reciprocating motion between the front and rear portions of the base plate 13, so that anyone can readily operate the apparatus to produce processed wrapped foods. Furthermore, even if the wrapped material foodstuff 1 expands gradually in the process of ripening and sterilization by the current conducted across the electrode plates 31, 31, the electrode plates 31, 31 move outwardly together with the movement guide rods 24, 24 while being maintained in pressure engagement with the wrapped material foodstuff 1, in a manner to prevent spontaneous rupture of the wrapping tube 2 and enable the current to be conducted uniformly through the entire body of the foodstuff in the wrapping tube 2 until the ripening and sterilization process is completed. Thus, the product processed foods can be compacted suitably at all times, so that the processed foods produced by the process and apparatus according to the invention have a good taste and uniform quality. Various modifications in the structure and function of the embodiments disclosed herein and in the steps of the process can be made by one skilled in the art without departing from the scope of the invention as defined by the claims.

What I claim is:

1. A method for the production of a wrapped food, comprising the steps of inserting end plate means of any shape as desired in open opposite end portions of a wrapping tube made of an electrically insulating material and bonding the end plate means to the wrapping tube to provide a unitary structure, the wrapping tube conforming to the shape of the end plate means, said end plate means each comprising a member having a flat surface portion substantially perpendicular to the length of the tube and having formed therein a multitude of apertures and a protruding edge portion formed integrally with and disposed at right angles to said flat surface portion and directed to the respective open end of the tube; charging an unprocessed foodstuff in said wrapping tube, said unprocessed foodstuff being previously immersed in a solution of salt for a certain period of time to bring the foodstuff to a salt-containing and dampened state; removably fitting a moisture absorbing electrical contact member previously impregnated with a solution of salt into surface contact with the flat surface of each member of said end plate means to prepare a wrapped material foodstuff; placing said wrapped material foodstuff in a container made of an electrically insulating material; bringing an electrode plate into pressure engagement with each of said electrical contact member whose surface has been flattened by contact with said end plate means, whereby the liquid oozing out of the foodstuff passes through the apertures and is absorbed by the contact member, the unprocessed foodstuff can be ripened and sterilized by the heat generated therein when a current is conducted across the electrode plates.

2. A method for the production of a wrapped food according to claim 1, wherein at least one of said end plate means has cuts made therein for charging the unprocessed foodstuff in the wrapping tube, said unprocessed foodstuff being charged in said wrapping tube through a material foodstuff supply hopper by forcing the material foodstuff supply hopper against the cuts and inserting the hopper into the wrapping tube through an opening formed in the end plate means.

3. A foodstuff wrapping tube unit comrising an electrically insulating wrapping tube filled with unprocessed foodstuff and comprising a cylindrical body and end plate means bonded to open opposite end portions of said cylindrical body, said end plate means each comprising a member having a flat surface portion formed with apertures therein and a protruding edge portion formed integrally with and disposed at right angles to said flat surface portion and directed to the respective open end portion of the tube, a pair of moisture absorbing electrical contact members previously impregnated with a salt solution and fitted into surface contact with the flat surface of said end plate means and a pair of sealing members detachably applied to the outer surface of said electrical contact members to provide a seal to said wrapping tube.

4. A foodstuff wrapping tube unit according to claim 3, wherein at least one of said end plate means has cuts made therein for charging the unprocessed foodstuff in said wrapping tube.

* * * * *